US009432861B1

(12) United States Patent
Vargantwar (10) Patent No.: US 9,432,861 B1
(45) Date of Patent: Aug. 30, 2016

(54) METHOD AND SYSTEM FOR DETERMINING WHETHER TO DISCONTINUE TRANSMISSION OF A REVERSE LINK SIGNAL (75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1606 days.

(21) Appl. No.: 12/783,532

(22) Filed: May 19, 2010

(51) Int. Cl.
*H04W 72/00* (2009.01)
*H04W 24/08* (2009.01)

(52) U.S. Cl.
CPC .................... *H04W 24/08* (2013.01)

(58) Field of Classification Search
USPC ............... 455/450, 451, 452.1, 452.2, 453
See application file for complete search history.

(56) References Cited

U.S. PATENT DOCUMENTS

| 6,246,872 | B1 | 6/2001 | Lee et al. |
| 6,334,047 | B1 * | 12/2001 | Andersson et al. ............ 455/69 |
| 6,480,472 | B1 | 11/2002 | Jou et al. |
| 6,633,760 | B1 | 10/2003 | Ham et al. |
| 6,745,031 | B2 | 6/2004 | Chun et al. |
| 6,754,498 | B2 | 6/2004 | Chun et al. |
| 7,010,319 | B2 | 3/2006 | Hunzinger |
| 7,130,667 | B2 | 10/2006 | Jin et al. |
| 7,570,976 | B2 | 8/2009 | Jin et al. |
| 2002/0068572 | A1 | 6/2002 | Chun et al. |
| 2002/0090947 | A1 | 7/2002 | Brooks et al. |
| 2005/0164742 | A1 * | 7/2005 | Rajkotia ...................... 455/561 |
| 2008/0207246 | A1 | 8/2008 | Shanbhag et al. |

OTHER PUBLICATIONS

3rd Generation Partnership Project 2, "Upper Layer (Layer 3) Signaling Standard for cdma2000 Spread Spectrum Systems," Revision E, 3GPP2 C.S0005-E, Sep. 2009.
U.S. Appl. No. 12/783,128, filed May 19, 2010.

* cited by examiner

*Primary Examiner* — Vladimir Magloire
*Assistant Examiner* — Sayed T Zewari (57) ABSTRACT

A mobile station involved in a call receives a forward link signal from a radio access network (RAN) and transmits a reverse link signal to the RAN. If the mobile station detects a reception failure of the forward link signal, such as the receipt of an errored frame, the mobile station determines the power level that the RAN used to transmit the forward link signal when the reception failure occurred. If the RAN was already transmitting at its maximum power level, the mobile station may discontinue transmission of the reverse link signal if the next frame from the RAN is also an errored frame. Otherwise, the mobile station defines a test period that is sufficient for the RAN to increase its transmit power to the maximum level. If the reception failure continues throughout the test period, the mobile station discontinues transmission of the reverse link signal.

19 Claims, 4 Drawing Sheets

METHOD AND SYSTEM FOR DETERMINING WHETHER TO DISCONTINUE TRANSMISSION OF A REVERSE LINK SIGNAL

BACKGROUND

In wireless telecommunication networks, such as cellular wireless networks, a radio access network (RAN) may communicate with a mobile station by transmitting forward link signals and the mobile station may communicate with the RAN by transmitting reverse link signals. When the mobile station is engaged in a call, the RAN may use a forward traffic channel to transmit forward link signals to the mobile station over and the mobile station may use a reverse traffic channel to transmit reverse link signals to the RAN.

During the call, the mobile station may monitor the forward link signals that the RAN transmits over the forward traffic channel. If the mobile station determines that it has lost contact with the RAN, the mobile station may disable its transmitter, thereby discontinuing its use of the reverse traffic channel. In a conventional approach, the mobile station determines that it has lost contact with the RAN when the mobile station fails to receive usable forward traffic channel frames during a fixed period of time.

For example, a recent spread spectrum standard, $3^{rd}$ Generation Partnership Project, "Upper Layer (Layer 3) Signaling Standard for cdma2000 Spread Spectrum Systems," Revision E, 3GPP2 C.S0005-E, September 2009 (hereinafter "3GPP2 Standard") defines a constant, $N_{2m}$. The $N_{2m}$ constant is described as follows: "The duration, of insufficient signal quality (e.g. bad frames), in units of 20 ms, received on the Forward Traffic Channel before a mobile station must disable its transmitter." See 3GPP2 Standard, Table D-2 on page D-8. The $N_{2m}$ constant is given a value of 12 frames (i.e., 240 ms) in this standard. Id.

OVERVIEW

In a first principal aspect, an exemplary embodiment provides a method for a mobile station. The mobile station receives a forward link signal from a radio access network (RAN) and transmits a reverse link signal to the RAN. The mobile station detects a reception failure of the forward link signal. The reception failure occurs at a first time. The mobile station determines that the RAN was transmitting the forward link signal at a first transmit power level at the first time. The mobile station defines a test period that is sufficient to allow the RAN to increase its transmit power from the first transmit power level to a second transmit power level. The mobile station determines whether the reception failure continues throughout the test period. If the reception failure continues throughout the test period, the RAN discontinues transmission of the reverse link signal.

In a second principal aspect, an exemplary embodiment provides a method for a mobile station. The RAN receives a reverse link signal that is wirelessly transmitted by the mobile station. The mobile station receives a forward link signal from a radio access network (RAN) and transmits a reverse link signal to the RAN. The mobile station detects a reception failure of the forward link signal. The reception failure occurs at a first time. The mobile station determines whether the RAN was transmitting the forward link signal at a maximum transmit power level at the first time. After determining that the RAN was transmitting at the maximum transmit power level at the first time, the mobile station discontinues transmission of the reverse link signal.

In a third principal aspect, an exemplary embodiment provides a mobile station comprising: (i) a transceiver for receiving a forward link signal transmitted by a radio access network (RAN) and for transmitting a reverse link signal to the RAN and (ii) a controller for controlling the transceiver system. The controller is configured to detect a reception failure of the forward link signal, determine a first transmit power level that the RAN used to transmit the forward link signal when the reception failure occurred, and, after the reception failure is detected, determine whether the transceiver should continue transmitting the reverse link signal.

DETAILED DESCRIPTION OF EXEMPLARY EMBODIMENTS

1. Introduction

The inventor has recognized that the conventional approach of using a fixed period of time to determine when a mobile station has lost contact with a RAN can lead to inefficiencies. For example, if the RAN is already transmitting at its maximum transmit power level when the mobile station begins receiving bad frames, then the mobile station's reception of the forward link signal is unlikely to improve. As a result, it may be inefficient for the mobile station to wait for the entire fixed period of time before discontinuing transmission of the reverse link signal (e.g., by disabling its transmitter). On the other hand, if the RAN is not already transmitting at its maximum transmit power level, then the mobile station's reception of the forward link signal may improve after the RAN increases its transmit power level. In that case, it may be beneficial for the mobile station to allow sufficient time for the RAN to increase its transmit power level (e.g., up to the RAN's maximum transmit power level) before discontinuing transmission of the reverse link signal.

Accordingly, the inventor proposes methods and systems in which a test period for deciding whether the mobile station should discontinue transmission of the reverse link signal is determined dynamically, instead of set at a fixed period of time. The dynamic determination of the test period may be triggered by the mobile station detecting a reception failure of a forward link signal transmitted by the RAN (e.g., when the mobile station is involved in a call).

Different criteria could be used for defining when a reception failure is detected. In one approach, a reception failure may be detected whenever the mobile station detects an errored frame or a missing frame in a series of frames transmitted by the RAN over a forward traffic channel. In another approach, a reception failure may be detected whenever the mobile station detects a certain consecutive number of errored or missing frames. Other criteria could also be used.

In response to detecting a reception failure, the mobile station may determine the transmit power level at which the RAN was transmitting the forward link signal when the reception failure occurred. If this transmit power level is already at the RAN's maximum transmit power level (or at some other sufficiently high level), then the mobile station may discontinue its transmission of the reverse link signal. Otherwise, the mobile station may define a test period that will determine whether to discontinue transmission of the reverse link signal. The test period may be defined so as to be sufficient to allow the RAN to increase its transmit power level to a selected higher level, such as the RAN's maximum transmit power level. For example, the RAN may be configured to increase its transmit power level in response to power control commands from the mobile station. In that case, the test period may be defined based on the period of time it would take for the mobile station to transmit power control commands that would cause the RAN to increase its transmit power level to the selected higher level.

Once the test period is defined, the mobile station may monitor the forward link signal transmitted by the RAN to determine whether the reception failure continues throughout the test period. Various criteria may be used to determine whether the reception failure continues throughout the test period. In some cases, the reception failure may be considered to continue throughout the test period when the mobile station fails to receive any non-errored frame during the test period. In other cases, the reception failure may be considered to continue throughout the test period when the mobile station fails to receive a sufficient number of consecutive non-errored frames. Other criteria could also be used.

If the mobile station determines that the reception failure continues throughout the test period, then the mobile station may discontinue transmission of the reverse link signal. For example, if the mobile station was using a reverse traffic channel for a call, the RAN may stop transmitting over the reverse traffic channel, thereby dropping the call and beneficially reducing noise on the reverse link.

If the mobile station determines that the reception failure does not continue throughout the test period, the mobile station may continue transmitting the reverse link signal. Thus, if the mobile station is involved in a call, the call could be maintained. However, the mobile station may also take further action to try to improve the quality of the call. For example, the mobile station may identify an additional base station that it could add to its active set.

As noted above, when the mobile station detects a reception failure of the RAN's forward link signal, the mobile station may determine the transmit power level that the RAN was using to transmit the forward link signal when the reception failure occurred. This determination could be made in different ways. In one approach, the mobile station may query the RAN to determine the transmit power level that the RAN was using. For example, the mobile station could transmit a forward traffic channel power level request message in an access channel. The RAN may receive the mobile station's request message and may transmit a response that indicates the transmit power level that the RAN was using for the forward link signal when the reception failure occurred. The RAN may transmit the response, for example, over a paging channel.

Other approaches could also be used. For example, the mobile station may refer to a report of the RAN's transmit power level that the mobile station received before the reception failure occurred. The mobile station may then infer what the RAN's transmit power level was when the reception failure occurred based on how the RAN would have adjusted its transmit power level from the reported level in response to power control commands that the mobile station subsequently transmitted to the RAN.

In other another approach, the mobile station may be able to estimate the transmit power level by comparing the received signal strength of the RAN's forward traffic channel with the received signal strength of the RAN's pilot channel. This comparison may provide a ratio of the two received signal strengths, which may, in turn, correspond to a ratio of the two transmit power levels. The transmit power level of the pilot channel may be a fixed value that the mobile station may be able to determine by referring to a base station almanac (BSA) or other information source. Thus, the mobile station may calculate an estimate of the transmit power level of the RAN's forward link signal based on a known transmit power level of the RAN's pilot channel and on signal strengths received by the mobile station.

By dynamically determining test periods in this way, the mobile station may discontinue transmission of the reverse link signal more quickly in those cases in which reception of the RAN's forward link signal is unlikely to improve. This, in turn, may beneficially result in less noise on the reverse link.

2. Exemplary Wireless Telecommunications Network

Figure 1:
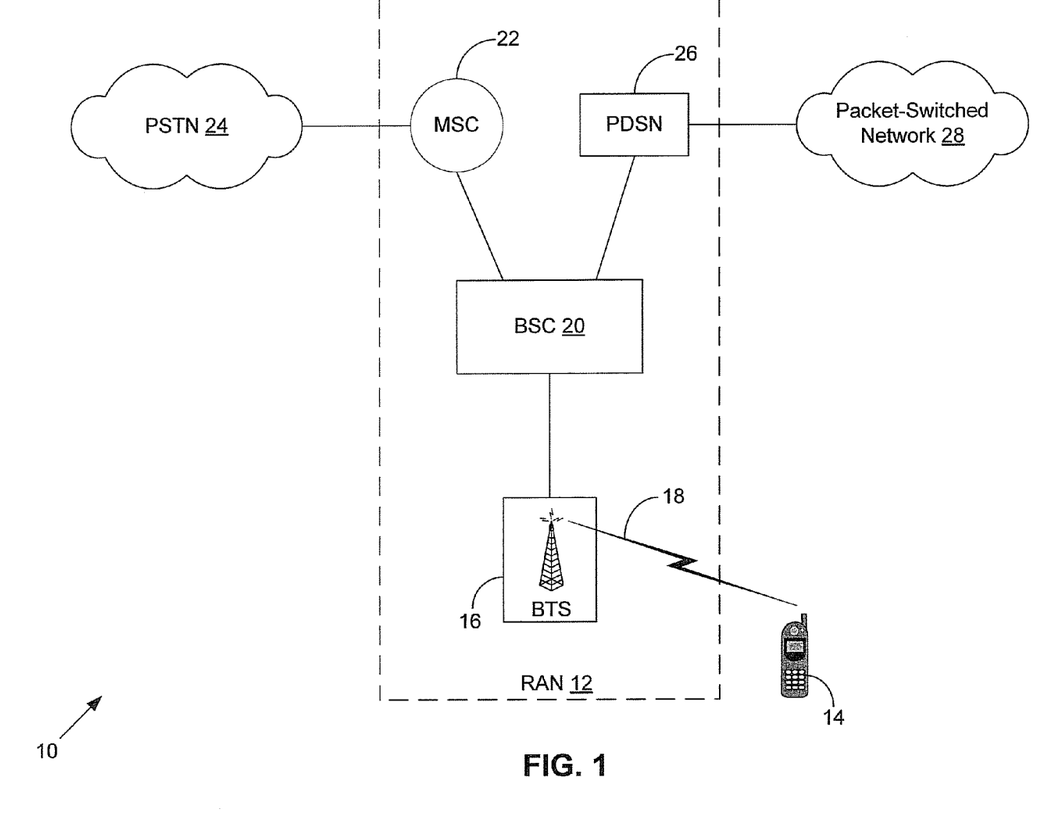
FIG. 1 is a block diagram of a wireless telecommunications network, in accordance with an exemplary embodiment.

FIG. 1 is a block diagram of a wireless telecommunications network 10 in which exemplary embodiments may be employed. Wireless telecommunications network 10 includes a radio access network (RAN) 12 that can wirelessly communicate with mobile stations, such as mobile station 14. Mobile station 14 could be, for example, a wireless telephone, wireless personal digital assistant, wirelessly-equipped computer, or other wireless communication device.

To support wireless communication with mobile stations, such as mobile station 14, RAN 12 may include one or more wireless access points, exemplified in FIG. 1 by base transceiver station (BTS) 16. BTS 16 has a wireless coverage area (e.g., a cell or one or more sectors) within which BTS 16 can wirelessly communicate with mobile stations. For example, BTS 16 may communicate with mobile station 14 over an air interface 18, as shown in FIG. 1. The wireless communications between BTS 16 and mobile station 14 over air interface 18 may be in accordance with a protocol such as 1×RTT CDMA, EVDO, GSM, WiMAX (IEEE 802.16), WiFi (IEEE 802.11), UMTS, LTE, or other wireless communication protocol.

Although FIG. 1 shows RAN 12 with only one wireless access point (BTS 16), it is to be understood that RAN 12 may include a greater number. RAN 12 may also include a controller, such as base station controller (BSC) 20, that controls one or more wireless access points, such as BTS 16. For example, when BTS 16 and mobile station 14 are involved in a call, BSC 20 may be involved in detecting and responding to a reception failure of a reverse link signal from mobile station 14.

RAN 12 may, in turn, be communicatively coupled to one or more other types of networks. For example, RAN 12 may include a mobile switching center (MSC) 22 that is communicatively coupled to a circuit-switched network, such as PSTN 24, and to BSC 20. Alternatively or additionally, RAN 12 may include a packet data serving node (PDSN) 26 that is communicatively coupled to a packet-switched network 28, such as the Internet, and to BSC 20. It is to be understood, however, that RAN 12 could be communicatively coupled to other types of networks and/or could be configured in other ways.

With the configuration of RAN 12 shown in FIG. 1, mobile station 14 may be able to engage in a voice call with one or more endpoints via PSTN 24. Such endpoints could be for example, landline stations or other mobile stations. Mobile station 14 may also be able to engage in a data call with one or more endpoints via packet-switched network 28. Such data calls may involve the exchange of voice (e.g., VoIP communications), data, video, and/or other media, with endpoints such as VoIP devices, e-mail servers, Web servers, gaming servers, instant messaging servers, or streaming media servers.

3. Exemplary Method

Figure 2:
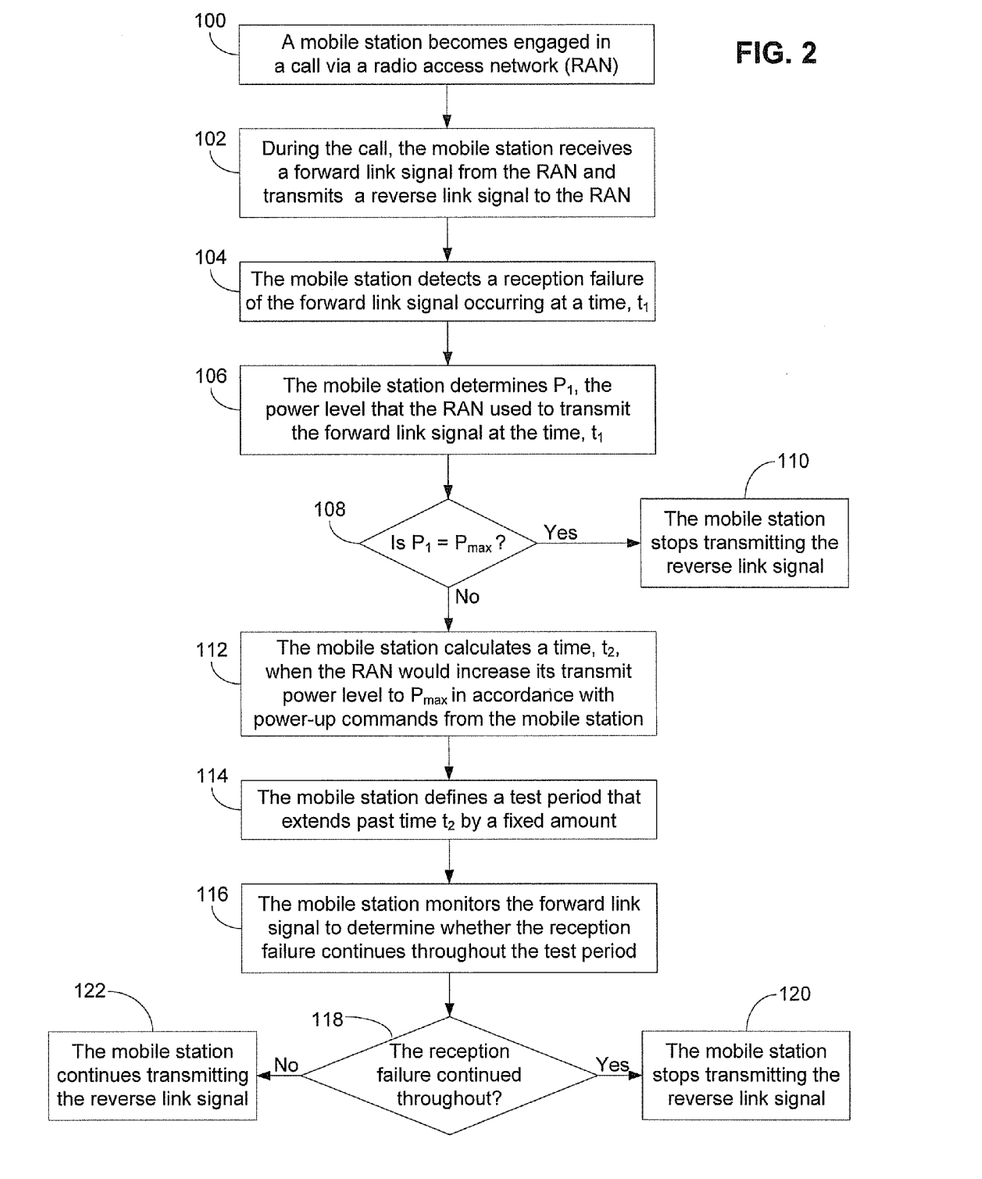
FIG. 2 is a flowchart of a method in which a mobile station responds to a reception failure of a forward link signal from a radio access network (RAN), in accordance with an exemplary embodiment.

FIG. 2 is a flow chart illustrating an exemplary method. For purposes of illustration, FIG. 2 is described with reference to the configuration of wireless telecommunications network 10 shown in FIG. 1. It is to be understood, however, that other configurations could be used.

The method begins when a mobile station (e.g., mobile station 14) becomes engages in a call via a radio access network (e.g., RAN 12), as indicated by block 100. The call could be, for example, a voice call (e.g., a call carried over PSTN 24) or a data call (e.g., a call carried over packet-switched network 28). During the call, the mobile station may receive a forward link signal from the RAN (e.g., over a forward traffic channel) and may transmit a reverse link signal to the RAN (e.g., over a reverse traffic channel), as indicated by block 102. With reference to FIG. 1, the forward link and reverse link signals could be exchanged between BTS 16 and mobile station 14 over air interface 18.

The mobile station may monitor the signal quality of the forward link signal from the RAN, for example, with respect to signal strength and/or error rate. Based on the signal quality of the forward link signal received by the mobile station, the mobile station may send power control commands that instruct the RAN to either increase or decrease the power level at which the RAN transmits the forward link signal. For example, the mobile station may transmit a power-up command that instructs the RAN to increase its transmit power level by a fixed increment or a power-down command that instructs the RAN to decrease its transmit power level by the fixed increment. The RAN may similarly monitor the reverse link signal from the mobile station and may send power control commands to the mobile station based on the signal quality of the reverse link signal received by the RAN.

At some point, the mobile station detects a reception failure of the forward link signal (the reception failure occurring at a time, $t_1$), as indicated by block 104. The mobile station may detect a reception failure in various ways. In an exemplary embodiment, the RAN transmits the forward link signal in a series of coded frames. For each coded frame that the mobile station receives, the mobile station decodes it, and then determines whether the frame was received with an error, for example, by using a cyclic redundancy check (CRC). If an error is detected, the mobile station may consider the frame to be a "bad" or errored frame and may consider a reception failure of the forward link signal to have occurred. Alternatively, the mobile station may use other criteria for detecting a reception failure, such as receiving a particular number of consecutive bad frames or receiving a particular number of bad frames within a given time period. Other criteria for detecting a reception failure could also be used.

In some cases, such as when the forward link signal experiences a deep fade, the mobile station may fail to receive a frame altogether. In such cases, the mobile station may consider the missing frame to be an errored frame and apply the same criteria used for errored frames for determining whether a reception failure has occurred. Alternatively, the mobile station may apply different criteria for a missing frame. For example, the mobile station might consider a reception failure to have occurred as soon as a missing frame is detected but may require two or more consecutive errored frames before determining a reception failure based on errored frames.

When the mobile station determines that a reception failure of the reverse link signal has occurred, the mobile station determines $P_1$, the power level that the RAN used to transmit the forward link signal at the time $t_1$, as indicated by block 106. The mobile station may determine $P_1$ in various ways. In an exemplary embodiment, the mobile station transmits to the RAN a message requesting the RAN to indicate the power level that the RAN used to transmit the forward link signal at time $t_1$. The RAN may then transmit a response that indicates $P_1$.

Once the mobile station has determined $P_1$, the mobile station may determine whether $P_1$ is equal to $P_{max}$, the RAN's maximum transmit power level, as indicated by block 108. If $P_1$ is equal to $P_{max}$, the mobile station may stop transmitting the reverse link signal, as indicated by block 110. In some embodiments, the mobile station may stop transmitting the reverse link signal immediately. Alternatively, the mobile station may wait for an additional period of time before making a final determination on whether to stop transmitting the reverse link signal. For example, the mobile station may wait to receive an additional frame of the forward link signal. If the additional frame is also a bad frame (e.g., an errored frame), then the mobile station may immediately discontinue transmitting the reverse link signal. If the additional frame is a good or non-errored frame, then the mobile station may continue transmitting the reverse link signal.

If $P_1$ is less than $P_{max}$, then the mobile station may calculate a time, $t_2$, when the RAN would increase its transmit power level to $P_{max}$ in accordance with power-up control commands from the mobile station, as indicated by block 112. For example, the mobile station may identify a sequence of N power-up commands that would, in combination, instruct the RAN to increase its transmit power level from $P_1$ to $P_{max}$. The mobile station may then determine $t_2$ based on the time it would take the mobile station to transmit the power-up commands to the RAN (e.g., the mobile station may transmit power control commands in accordance with a preset schedule) and for the RAN to adjust its transmit power level in response to the power-up commands.

Figure 3:
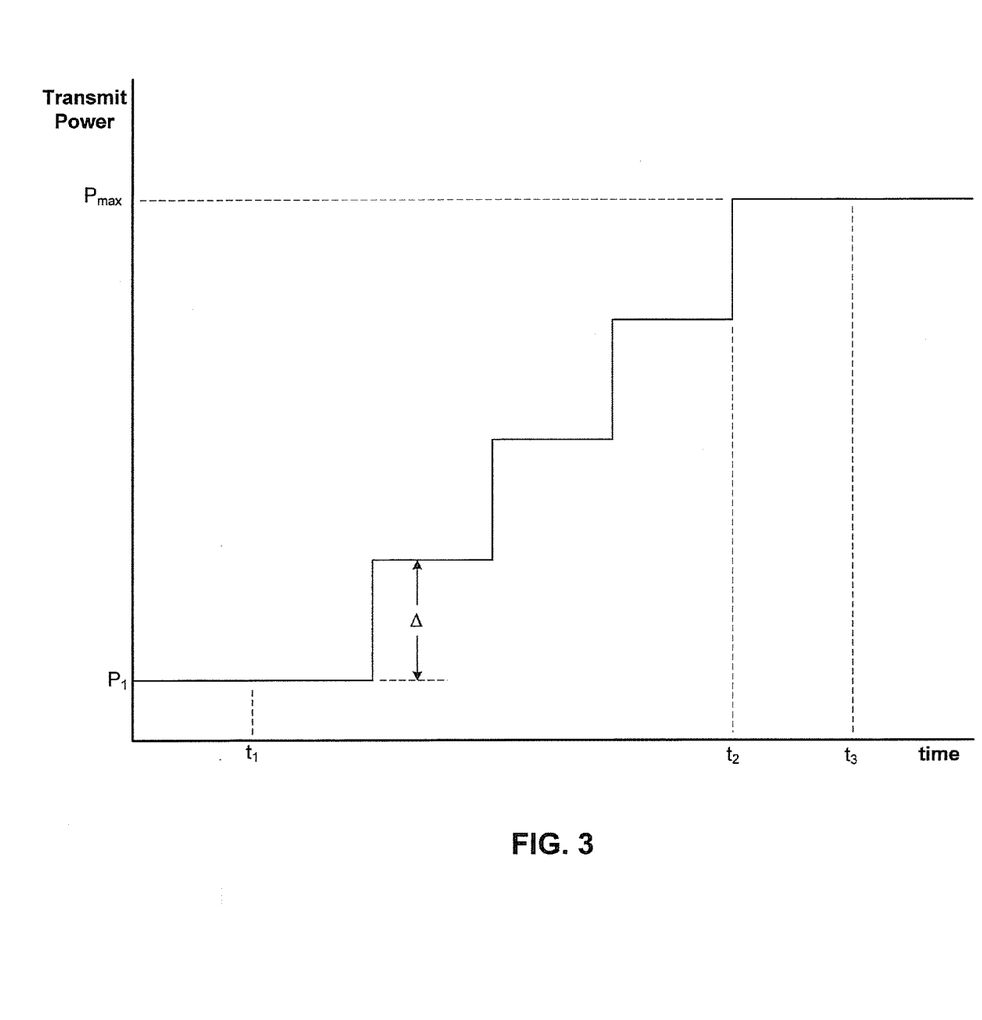
FIG. 3 is a graph of a RAN's transmit power level as a function of time, in accordance with an exemplary embodiment.

FIG. 3 illustrates an example in which four power-up commands are sufficient to raise the RAN's transmit power level from $P_1$ to $P_{max}$. In particular, each power-up command instructs the RAN to increase its transmit power level by a fixed power increment, $\Delta$, and four of these fixed power increments makes up for a difference between $P_1$ and $P_{max}$ (i.e., $4\Delta > P_{max} - P_1$). As shown in FIG. 3, the time $t_2$ is the time when the RAN begins transmitting at the power level $P_{max}$, after receiving four power-up commands from the mobile station.

The mobile station then defines a test period based on $t_2$. For example, the mobile station may define the test period so that it extends past t2 by a fixed amount of time, as indicated by block 114. The fixed amount of time could be, for example, one frame (e.g., 20 ms). In FIG. 3, the end of the test period is at time $t_3$.

The mobile station then monitors the forward link signal to determine whether the reception failure continues throughout the test period, as indicated by block 116. For example, the mobile station may continue to receive and decode frames transmitted in the RAN's forward link signal. If the frames continue to be errored (or missing) until the end of the test period, the mobile station may determine that the reception failure has continued throughout the test period. On the other hand, if the mobile station receives a "good" or non-errored frame during the test period, the mobile station may consider the reception failure to have ended during the test period. Alternatively, the mobile station may apply other criteria for determined whether the reception failure has ended. For example, the mobile station may require a particular number of consecutive good frames in order to determine that the reception failure has ended.

During the test period, the mobile station continues to send power control commands to the RAN. The power control commands sent by the mobile station could be the sequence of power-up commands that the mobile station used to define the test period. Thus, in the example of FIG. 3, the mobile station determined that four power-up commands would be sufficient to raise the RAN's transmit power level to $P_{max}$. After defining the test period based on the time it would take to transmit these four power-up commands, the mobile station may transmit the four power-up commands and the RAN may, in response, increase its transmit power level in a step-wise fashion as shown in FIG. 3. It is to be understood, however, that if reception conditions improve during the test period (e.g., the reception failure ends during the test period), then the mobile station might not end up transmitting all of the anticipated power-up commands.

Whether the mobile station continues transmitting the reverse link signal depends on whether the reception failure continued throughout the test period, as indicated by block 118. If the mobile station determines that the reception failure continued throughout the test period, the mobile station stops transmitting the reverse link signal, as indicated by block 120. If not (i.e., the mobile station determines that the reception failure ended during the test period), the mobile station continues transmitting the reverse link signal, as indicated by block 122.

In this way, the mobile station may respond to a reception failure in a dynamic manner. In this dynamic approach, the mobile station defines a test period that is used to decide whether to continue transmitting the reverse link signal. The test period may be defined based on the time it takes for the RAN to increase its transmit power level from the power level used when the reception failure occurred to a higher power level (such as a maximum power level). This dynamic approach may beneficially reduce noise on the reverse link by reducing the times when mobile stations transmit reverse link signals unnecessarily.

4. Exemplary Mobile Station

Figure 4:
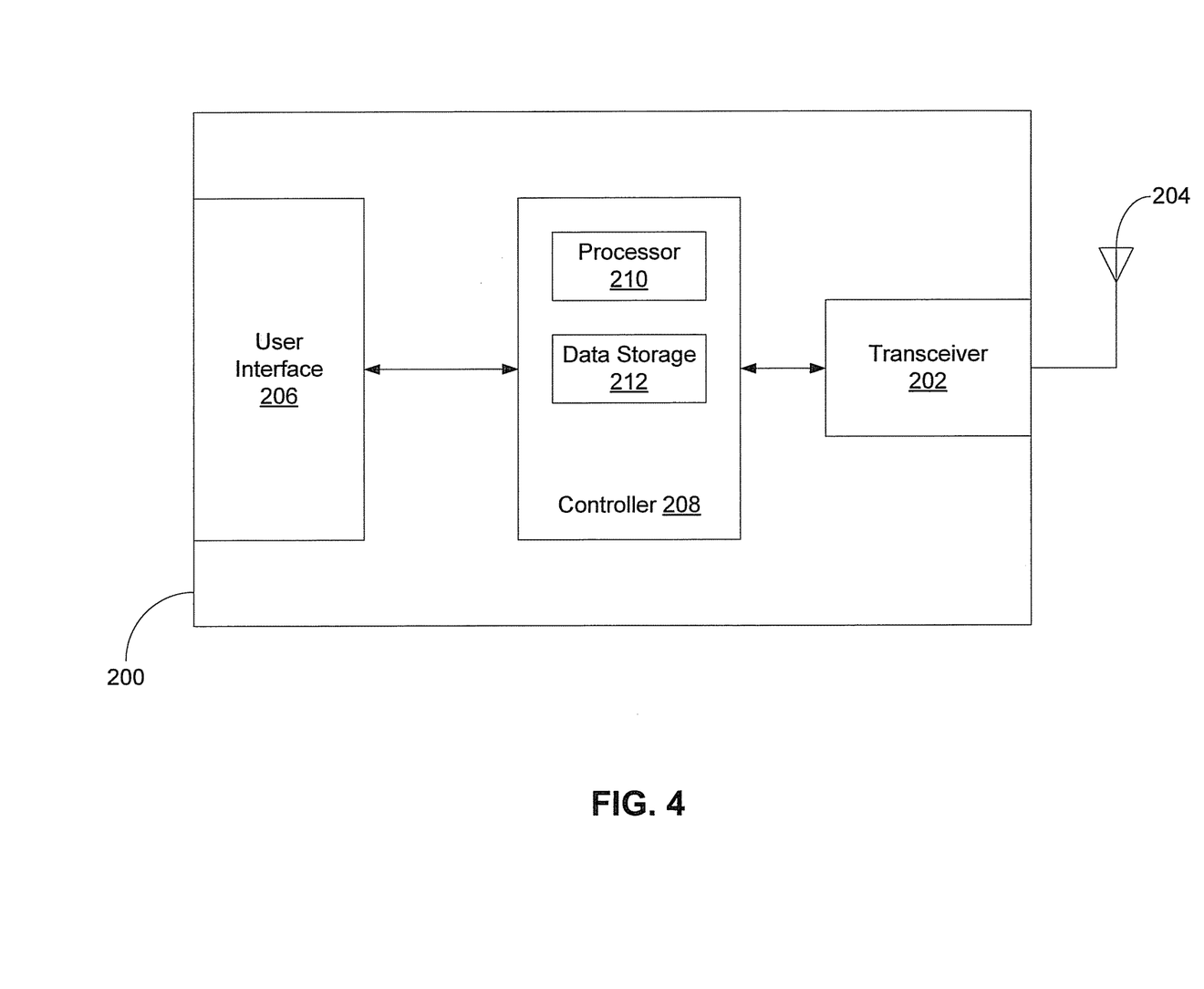
FIG. 4 is a block diagram of a mobile station, in accordance with an exemplary embodiment.

FIG. 4 illustrates an exemplary mobile station 200 that may function in accordance with the method described above and illustrated in FIG. 2. Mobile station 200 may include a transceiver 202 for communicating with a RAN (e.g., RAN 12), via one or more antennas, exemplified in FIG. 4 by antenna 204. When mobile station 200 is involved in a call, transceiver 202 may use a reverse traffic channel to transmit a reverse link signal for the call to the RAN, and transceiver 202 may receive a forward link signal for the call from the RAN over a forward traffic channel. Transceiver 202 may be able to use other reverse link channels, such as access channels, to transmit reverse link signals to the RAN, and transceiver 202 may receive forward link signals from the RAN over other forward link channels, such as a pilot channel or a paging channel.

Mobile station 200 may include a user interface 206 that allows a user to interact with mobile station 200. User interface 206 may include a speaker and microphone that allow mobile station 200 to receive audio from the user and to convey audio to the user, for example, when mobile station 200 is involved in a voice call. User interface 206 may also include a display screen for displaying text, graphics, video or other visual information to the user and may include one or more input devices, such as a keypad, buttons, or touch screen, to receive input from the user.

Mobile station 200 also includes a controller 208, which may be communicatively coupled to transceiver 202 and user interface 206. Controller 208 may be configured to control at least some of the functions of mobile station 200. More particularly, controller 208 may be configured to detect and to respond to a reception failure of a forward link signal from a RAN. For example, after detecting a reception failure, controller 208 may be configured to determine a transmit power level that the RAN used to transmit the forward link signal when the reception failure occurred, such as by instructing transceiver 202 to query the RAN. Controller 208 may be further configured to determine whether the transmit power level that the RAN was using when the reception failure occurred was the RAN's maximum transmit power level and, if so, instruct transceiver 202 to discontinue transmission of the reverse link signal.

If the transmit power level that the RAN was using when the reception failure occurred was less than the RAN's maximum transmit power level, then controller 208 may be configured to define a test period that is sufficient to allow the RAN to increase its transmit power level to its maximum level, and to determine whether the reception failure continues throughout the test period. If the reception failure continues throughout the test period, controller 208 may instruct transceiver 202 to discontinue transmission of the reverse link signal. Otherwise, controller 208 may control transceiver 202 so that it continues transmitting the reverse link signal.

Controller 208 may be implemented as hardware, firmware, and/or software. For example, controller 208 may include a processor 210 that executes program instructions stored in data storage 212. In this way, controller 208 may control transceiver 202 to either continue or discontinue transmitting a reverse link signal when a reception failure of a corresponding forward link signal is detected.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a mobile station, said method comprising:
    said mobile station receiving a forward link signal from a radio access network (RAN) and transmitting a reverse link signal to said RAN;

said mobile station detecting a reception failure of said forward link signal, said reception failure occurring at a first time;

said mobile station determining that said RAN was transmitting said forward link signal at a first transmit power level at said first time;

said mobile station defining a test period based on said first transmit power level, such that said test period is sufficient to allow said RAN to increase its transmit power from said first transmit power level to a second transmit power level;

said mobile station determining whether said reception failure continues throughout said test period; and if said reception failure continues throughout said test period, said mobile station discontinuing transmission of said reverse link signal.

2. The method of claim 1, wherein said mobile station is involved in a call with an endpoint via said RAN.

3. The method of claim 2, wherein said mobile station receiving a forward link signal from a radio access network (RAN) and transmitting a reverse link signal to said RAN comprises:

said mobile station receiving said forward link signal for said call over a forward traffic channel; and said mobile station transmitting said reverse link signal for said call over a reverse traffic channel.

4. The method of claim 1, wherein said forward link signal comprises a series of frames, and wherein said mobile station detecting a reception failure of said forward link signal comprises:

determining that a frame of said forward link signal that said mobile station received at said first time was an errored frame.

5. The method of claim 4, wherein said mobile station determining whether said reception failure continues throughout said test period comprises:

determining whether said mobile station receives a non-errored frame during said test period.

6. The method of claim 1, wherein said second transmit power level is a maximum transmit power level.

7. The method of claim 1, wherein said mobile station defining a test period based on said first transmit power level, such that said test period is sufficient to allow said RAN to increase its transmit power from said first transmit power level to a second transmit power level comprises:

selecting a sequence of one or more power control commands that would instruct said RAN to increase its transmit power from said first transmit power level to said second transmit power level;

determining a second time when said RAN would begin transmitting at said second transmit power level in accordance with said sequence of one or more power control commands; and defining said test period so as to include said second time.

8. The method of claim 7, wherein defining said test period so as to include said second time comprises:

defining said test period so that it extends past said second time by a preset amount of time.

9. The method of claim 7, wherein said sequence of one or more power control commands comprises N power-up commands, wherein each of said power-up commands instructs said RAN to increase its transmit power by a fixed power increment.

10. The method of claim 9, wherein selecting a sequence of one or more power control commands that would instruct said RAN to increase its transmit power from said first transmit power level to said second transmit power level comprises:

selecting N such that N of said fixed power increments makes up for a difference between said first and second transmit power levels.

11. The method of claim 7, wherein determining a second time when said RAN would begin transmitting at said second transmit power level in accordance with said sequence of one or more power control commands comprises:

determining said second time based on when said mobile station would complete a transmission of said sequence of one or more power control commands to said RAN.

12. The method of claim 11, further comprising:

said mobile station transmitting said sequence of one or more power control commands to said RAN during said test period.

13. The method of claim 1, wherein said mobile station determining that said RAN was transmitting said forward link signal at a first transmit power level at said first time comprises:

said mobile station transmitting a request to said RAN;

said mobile station receiving a response to said request, wherein said response identifies said first transmit power level.

14. A method for a mobile station, said method comprising:

said mobile station receiving a forward link signal from a radio access network (RAN) and transmitting a reverse link signal to said RAN;

said mobile station detecting a reception failure of said forward link signal, said reception failure occurring at a first time;

said mobile station determining whether said RAN was transmitting said forward link signal at a maximum transmit power level at said first time;

if said RAN was transmitting at said maximum transmit power level at said first time, said mobile station discontinuing transmission of said reverse link signal;

if said RAN was transmitting at less than said maximum transmit power level at said first time, said mobile station defining a test period that is sufficient to allow said RAN to increase its transmit power to said maximum transmit power level;

said mobile station determining whether said reception failure continues throughout said test period; and if said reception failure continues throughout said test period, said mobile station discontinuing transmission of said reverse link signal.

15. The method of claim 14, wherein said mobile station defining a test period that is sufficient to allow said RAN to increase its transmit power to said maximum transmit power level comprises:

selecting a sequence of one or more power control commands that would instruct said RAN to increase its transmit power to said maximum transmit power level;

determining a second time when said RAN would begin transmitting at said maximum transmit power level in accordance with said sequence of one or more power control commands; and defining said test period so as to include said second time.

16. A mobile station, comprising:

a transceiver for receiving a forward link signal transmitted by a radio access network (RAN) and for transmitting a reverse link signal to said RAN; and a controller for controlling said transceiver, wherein said controller is configured to detect a reception failure of said forward link signal, determine a first transmit power level that said RAN used to transmit said forward link signal when said reception failure occurred, and define a test period based on said first transmit power level, such that said test period is sufficient to allow said RAN to increase its transmit power from said first transmit power level to a second transmit power level.

17. The mobile station of claim 16, wherein said controller is further configured to instruct said transceiver to discontinue transmission of said reverse link signal in response to a determination that said reception failure continued throughout said test period.

18. The mobile station of claim 16, wherein said controller is further configured to determine said first transmit power level by querying said RAN.

19. The mobile station of claim 16, wherein said second transmit power level is a maximum transmit power level.

* * * * *